Oct. 22, 1968 D. J. CRIMMINS 3,407,375

MOLDED BUS ASSEMBLY

Filed Oct. 20, 1965 3 Sheets-Sheet 1

INVENTOR.
DAVID J. CRIMMINS
BY
Kenyon & Kenyon
ATTORNEYS

INVENTOR.
DAVID J. CRIMMINS
BY
Kenyon & Kenyon
ATTORNEYS

INVENTOR.
DAVID J. CRIMMINS
BY
Kenyon & Kenyon
ATTORNEYS 3,407,375

MOLDED BUS ASSEMBLY

David J. Crimmins, Pennington, N.J., assignor to The Thomas & Betts Co., Elizabeth, N.J., a corporation of New Jersey Filed Oct. 20, 1965, Ser. No. 498,337
7 Claims. (Cl. 339—22)

ABSTRACT OF THE DISCLOSURE

An integrally molded bus assembly having a body portion and at least one housing integrally molded with the body portion. The body portion encapsulates an electrically conductive but assembly having at least one tab extending into a channel provided in the housing. The housing is adapted to receive an electrical terminal which is affixed to the tab.

This invention relates to a new and improved bus assembly and method and apparatus for making same and more particularly to a new and improved bus assembly which is of molded insulating material and which includes a connector housing integral with the bus assembly.

Bus assemblies are widely used in electronic applications such as computers. In one such form of bus assembly, it is desirable that there be controlled capacitance between a pair of buses. Such a bus assembly comprised a pair of conducting plates separated by a sheet of dielectric, and suitably insulated by separate outer layers of insulating material to form a five-layer laminate. Protruding externally of the plates are tabs to which are attached, by welding or the like, individual terminal contacts which are housed in separable connector housings affixed to the bus assembly after the contacts have been attached thereto.

This prior art bus assembly and connector combination possessed a number of disadvantages. In the first place, since the bus assembly was a laminate, it was prone to delamination between various layers of the laminate due to temperature and humidity changes. Secondly, the sequential operation of first attaching the contacts to the tabs protruding from the bus assembly and then affixing connector housings about the bus assembly and contacts caused problems in positioning the housing on the assembly without dislodging individual contacts. Lastly, the separate connector housings were prone to loosening or becoming askew on the bus assembly. In order to overcome these disadvantages of the prior art bus assembly, the molded bus assembly of the present invention was developed.

In general, the bus assembly of the present invention comprises a sandwich structure of two conducting plates having oppositely disposed tabs extending transversely along one edge thereof, the plates being separated by a sheet of dielectric material and the entire sandwich structure being insulated by insulation molded about it. The tabs extending transversely of the conducting plates are kept free of insulation and extend into connector housings that are disposed on either side of the molded insulation and that are molded integral therewith. The unique configuration of the interior chamber of the connector housing provides for easy insertion of terminal contacts into the housing while preventing stressing or damaging of the contact during insertion and while providing positive positioning of the contact within the housing during attachment of the contact to the tab. According to the novel molding method and apparatus of the present invention, the bus structure is molded about with insulation while the tabs are kept free of insulation.

It has been found that the molded bus assembly of the present invention eliminates the problems inherent in the prior art bus assemblies while providing controlled capacitance along the length of the assembly. By the use of molded insulation, the problem of delaminating is eliminated and the electrical characteristics of the bus assembly are greatly improved in that short circuiting between buses due to moisture leakage is virtually eliminated. By molding the connector housings integral with the molded bus insulation and attaching the connectors within said housings after the molding operation, the problems of displacement of connector housings and breaking off of contacts are eliminated.

It is thus an object of the present invention to provide a new and improved bus assembly which is resistant to delamination.

It is a further object of the present invention to provide a molded bus assembly which provides controlled capacitance between the conducting plates of the bus assembly.

It is a still further object of the present invention to provide a new and improved bus assembly in which the bus sandwich is molded about with insulating material with at least one connector housing molded integrally therewith.

It is yet another object of the present invention to provide a molded bus assembly having a connector housing molded integral therewith which allows easy insertion of a terminal contact into the connector housing while avoiding stressing or damaging of the contact during insertion.

It is still another object of the present invention to provide a new and improved method and apparatus for molding bus assemblies.

Other and further objects will be evident to those skilled in the art from the following description and drawings in which.

Figure 1:
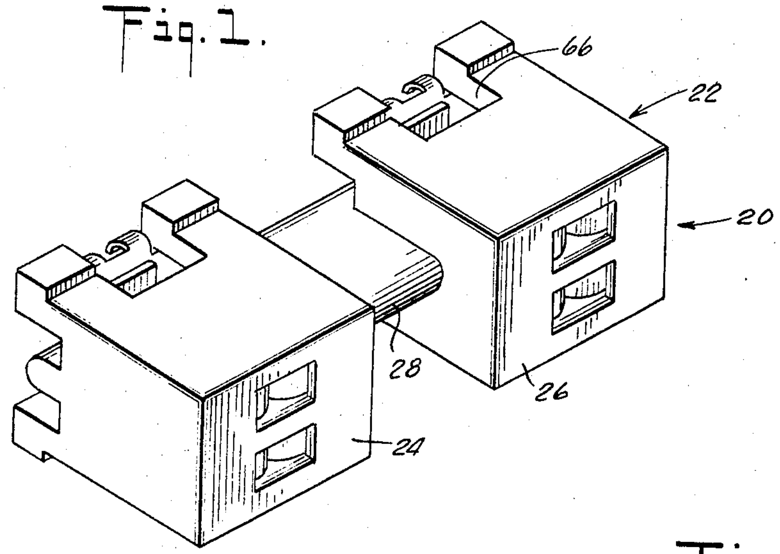
FIG. 1 is a perspective view of a two-position bus assembly according to the present invention.
Figure 2:
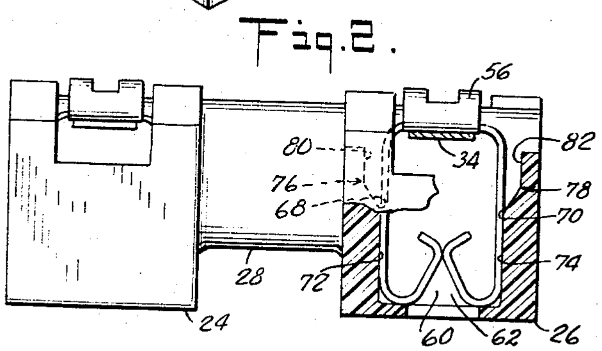
FIG. 2 is a partially sectional top plan view of the embodiment shown in FIG. 1.

Referring now to the figures and more particularly to FIG. 1, there is shown in perspective view one embodiment of the molded bus assembly of the present invention. As shown, the molded bus assembly is denoted generally by the numeral 20 and comprises an insulator body 22 of suitable molding insulating material such as plastic or the like having a pair of identical connector housings 24 and 26 and an intermediate longitudinal portion 28.

Figure 5:
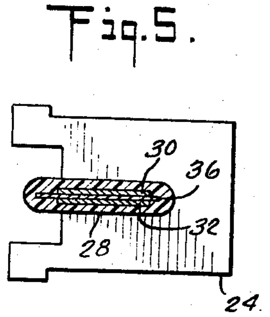
FIG. 5 is a partially sectional elevational side view taken along line 5—5 of FIG. 4.
Figure 3:
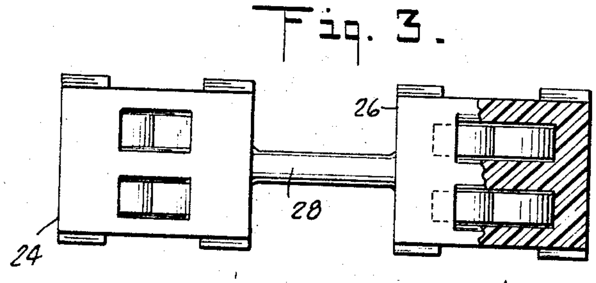
FIG. 3 is a partially sectional elevational view taken along one longitudinal side of the embodiment of FIG. 1.
Figure 6:
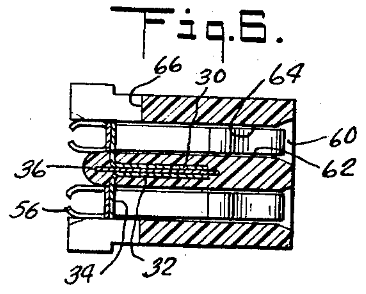
FIG. 6 is a partially sectional elevational view taken along line 6—6 of FIG. 4.
Figure 4:
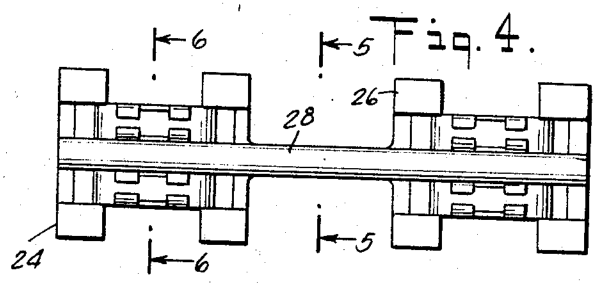
FIG. 4 is an elevational view taken along the other longitudinal side of the embodiment of FIG. 1.
Figures 7, 9:
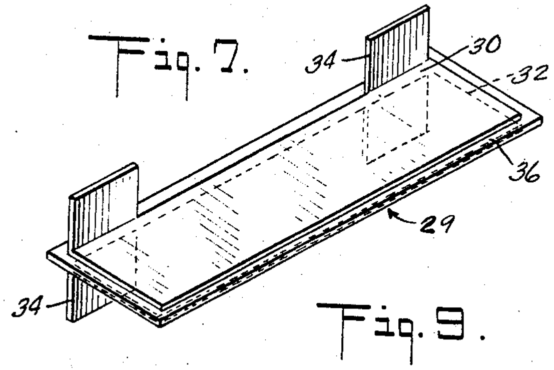
FIG. 7 is a perspective view of a bus sandwich.
FIG. 9 is a partially sectional elevational view of a portion of apparatus for making the molded bus assembly of FIG. 1 taken along line 9—9 of FIG. 10.
Figure 10:
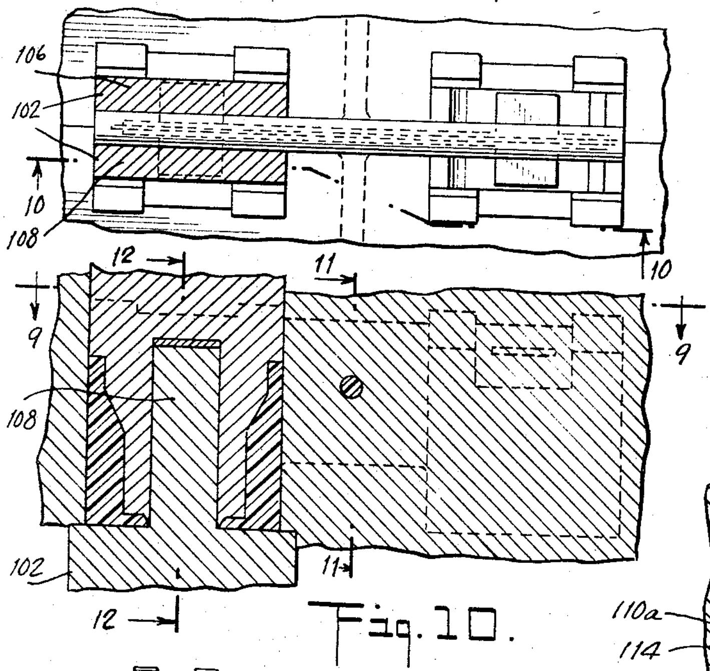
FIG. 10 is a top plan view taken along line 10—10 of FIG. 9.

Referring to FIGS. 2–8, there is shown in more detail the embodiment of the present invention shown in FIG. 1. As shown in FIG. 7, the bus sandwich 29 to be encapsulated in insulation comprises a pair of conducting plates 30 and 32, 32 being shown in dotted form, each of said plates 30 and 32 having tabs 34 extending transversely to the surface thereof. Tabs 34 of conducting plates 30 and 32 are positioned in oppositely disposed pairs and extend in opposite directions. Tabs 34 are preferably formed integrally with conducting plates 30 and 32, although they may be affixed thereto by welding, soldering or the like. Plates 30 and 32 are separated by a sheet of dielectric material 36 which may be any suitable dielectric material such as plastic, mica or the like. In order to increase the leakage path between plates 30 and 32 and thus increase the resistance to short circuiting therebetween, it is preferable that sheet 36 overlap the edges of plates 30 and 32. Sheet 36 establishes a controlled capacitance between plates 30 and 32 and is preferably bonded thereto, in order to form a three-layer bus sandwich by plates 30, 32 and sheet 36.

As shown in FIGS. 2–6, the bus sandwich is encapsulated in a molded insulator body by suitable molding apparatus to be described hereinafter. Tabs 34 are kept free of insulation for attachment of suitable terminal contacts such as contacts 38 shown in FIG. 8.

Figure 8:
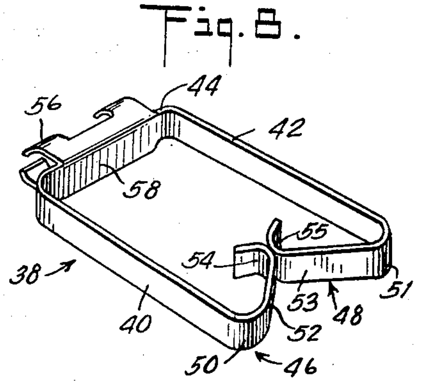
FIG. 8 is a perspective view of a terminal contact.

As shown in FIG. 8, contact 38 is U-shaped and comprises legs 40 and 42 and an intermediate connecting member 44. The ends of legs 40 and 42 are provided with inwardly curved spring portions 46 and 48. The distance between legs 40 and 42 preferably increases gradually from member 44 toward portion 46 and 48 in order that spring portions 46 and 48 may be compressed toward each other when completely inserted within housing 26. Spring portions 46 and 48 respectively have first curved sections 50 and 51, straight sections 52 and 53, and second curved sections 54 and 55. Curved sections 54 and 55 are adapted to be in engagement and to bear against a male element (not shown) to be inserted therebetween. Straight sections 52 and 53 are respectively angled with respect to legs 40 and 42 and act as rearwardly sloping surfaces for guiding said male element into contact with curved sections 54 and 55. Intermediate member 44 is provided with a double-pronged gripping portion 56 extending from the outer face thereof and an inner face 58 which is adapted to be affixed to the contiguous face 59 of tab 34.

As shown in FIG. 5, bus sandwich 29 is encapsulated in molded insulation and is rigidly held thereby. As shown in FIG. 6, tabs 34 of plates 30 and 32 protrude externally of the molded insulation into the interior of housing 24. Connector housings 24 and 26 have upper and lower portions having identical channels running the length thereof, which are adapted to receive contacts 38.

As shown in FIG. 6, channel 60 of housing 26 has a lower wall 62 extending the length of channel 60 and an upper wall 64 which also runs substantially the length of channel 60 but which has a notched recess 66 at one end thereof. The spacing between walls 62 and 64 is sufficiently greater than the height of connector 38 to provide easy insertion of contact 38 while providing firm support thereof after insertion. As shown, channel 60 has a pair of side walls 68 and 70 which end short of lower wall 62. It will be understood that walls 68 and 70 could also extend to the end of wall 62. Walls 68 and 70 respectively have straight forward portions 72 and 74, chamfered intermediate portions 76 and 78 and straight rearward portions 80 and 82. The spacing between forward portions 72 and 74 respectively of walls 68 and 70 is equal to or greater than the length of intermediate member 44 of contact 38 but preferably less than the width of contact 38 at its widest point when uncompressed. Rearward portions 80 and 82 respectively of walls 68 and 70 are spaced sufficiently far apart to allow insertion of legs 40 and 42 of contact 38 past tab 34, but are spaced sufficiently close together to prevent legs 40 and 42 of contact 38 from becoming distorted or from becoming stressed beyond the yield point of the material from which contact 38 is formed. Proper spacing between wall portions 72 and 74 is essential so that legs 40 and 42 of contact 38 do not lose their springiness or do not become distorted upon insertion of contact 38 into housing 26.

Figure 14:
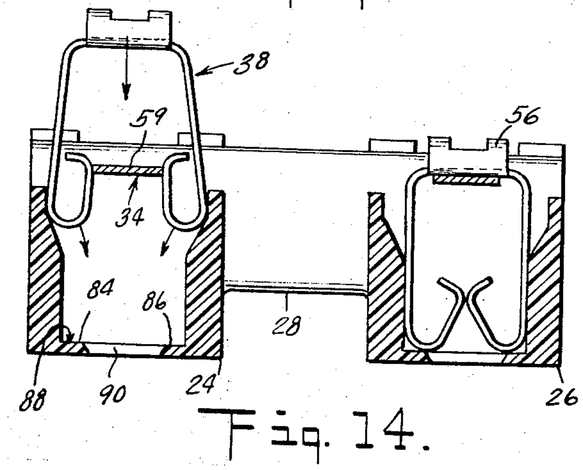
FIG. 14 is a partially sectional top plan view of the embodiment shown in FIG. 1 showing the insertion of connector elements.

Referring now to FIG. 14, contact 38 is shown being inserted into channel 60 of housing 24. Insertion of contact 38 into channel 60 of housing 26 is accomplished as follows: Curved spring portions 46 and 48 first engage the edges of tab 34. As contact 38 is inserted further into channel 60, the tab 34 presses against sections 52 and 53 of legs 40 and 42, causing spring portions 46 and 48 to be compressed toward legs 40 and 42 and causing legs 40 and 42 to be bent outwardly. As tab 34 further compresses spring portion 46 and 48 and further tends to bend legs 40 and 42 outwardly, chamfered portions 76 and 78 of walls 68 and 70 come into bearing contact with curved sections 50 and 51 of legs 40 and 42 to exert a force which tends to counteract the outward bending force exerted by tab 34. Thus, the interaction of walls 68 and 70 and tab 34 of legs 40 and 42 during the insertion of contact 38 past tab 34 is such as to maintain a relatively constant pressure on legs 40 and 42 without stressing them beyond their yield point and without permanently deforming them.

After spring portions 46 and 48 clear tab 34, the action of wall portions 72 and 74 on legs 40 and 42 cause spring portions 46 and 48 to compress against one another, thus creating firm contact at curved sections 54 and 55. Contact 38 is completely inserted into channel 60 when the surface 58 of intermediate member 44 of connector 38 has engaged surface 59 of tab 34. In this position, curved sections 50 and 51 of connector 38 will have come into contact with shoulders 84 and 86 forming a part of forward wall 88 of channel 60. An aperture 90 is provided in forward wall 88 of channel 60 to allow insertion of a blade terminal. As shown more clearly in FIG. 6, upper and lower walls 62 and 64 of channel 60 are beveled at aperture 90 in order to guide a blade terminal into aperture 90 and into engagement with contact 38. Recess 66 in upper wall 64 allows insertion of a welding tool (not shown) or the like for attachment of contact 38 to tab 34.

After attachment of contact 38 to tab 34, gripping portion 56 of contact 38 may be affixed to suitable attachment means (not shown) provided on the chassis or other component to which the molded bus assembly is to be attached.

Figure 13:
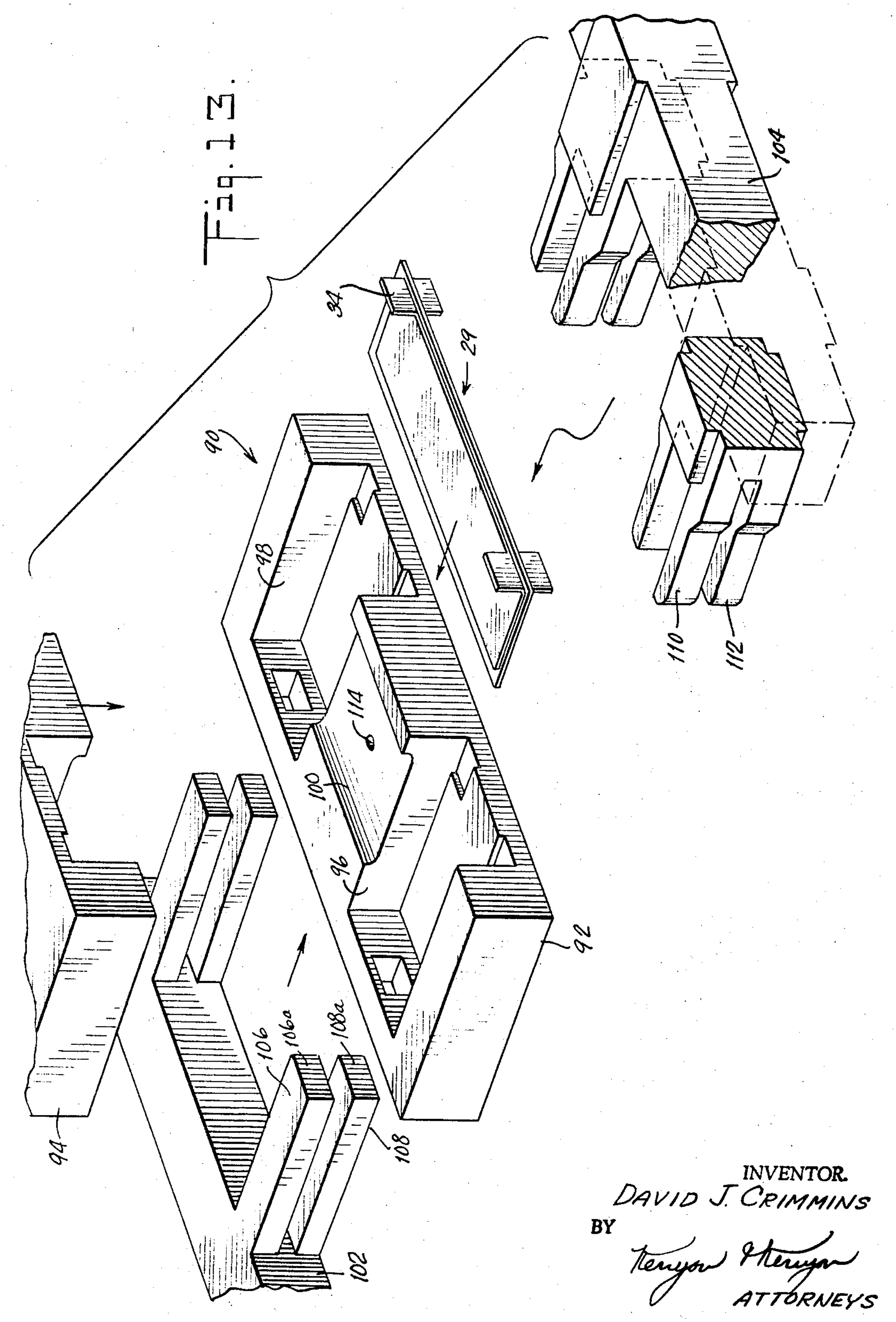
FIG. 13 is an exploded view of molding apparatus for forming the embodiment of FIG. 1.

Referring now to FIGS. 9–13, there is shown one molding apparatus for molding the bus assembly of the embodiment of the present invention shown in FIG. 1. Referring specifically to FIG. 13, there is shown in exploded view molding apparatus 90 comprising lower mold 92 and upper mold 94. Lower mold 92 has a pair of molding cavities 96 and 98 connected by molding channel 100. Upper mold 94 has a cavity configuration complementary to that of mold 92.

In order to keep tabs 34 of bus structure 29 free of molding material during the molding operation and in order to properly position bus structure 29 within molds 92 and 94, a pair of telescoping cores 102 and 104 are provided. Core 102 is provided with a pair of fingers 106 and 108 adapted to telescope within U-shaped fingers 110 and 112 of core 104. When cores 102 and 104 are mated, leading faces 106*a* and 108*a* respectively of fingers 106 and 108 engage one side of tabs 34 and inner rear faces 110*a* and 112*a* respectively of fingers 110 and 112 engage the other side of tabs 34. At the same time, the inner side faces of fingers 110 and 112 engage the side edges of tabs 34 and projecting members 114 and 116 engage the extreme edges of tabs 34.

Thus, when cores 102 and 104 are telescoped to engage tabs 34 of bus sandwich 29, sandwich 29 is properly positioned and firmly held within molds 92 and 94 in order to assure proper molding of insulator body 22. The general shape of channels 60 of connector housing 26 and of insulator body 22 is controlled by the configuration of cores 102 and 104 as well as the configuration of the cavities of molds 92 and 94. By changing the configurations of these elements, both the general shape and the channeling of insulator body 22 may also be changed to suit individual needs.

Figure 11:
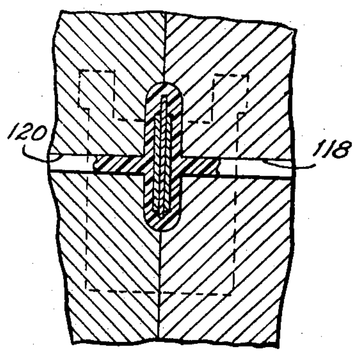
FIG. 11 is a sectional elevational view taken along line 11—11 of FIG. 10.
Figure 12:
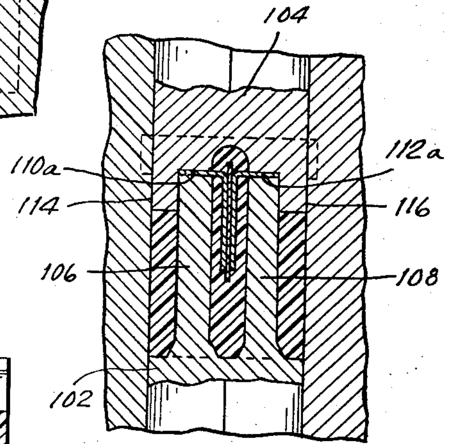
FIG. 12 is a sectional elevational view taken along line 12—12 of FIG. 10.

As shown in FIG. 11, molding material is introduced into molds 92 and 94 through apertures 118 and 120 located between cavities 96 and 98. By introducing the molding material at this point rather than at the side of cavity 96 or cavity 98, bending of bus structure 29 during the molding operation is avoided and a relative uniform thickness of molded insulating material is achieved on either side of structure 29.

Although specific embodiments of the present invention have been described hereinabove and are shown in the drawings, modifications and equivalents thereof will be readily apparent to those skilled in the art. Therefore, it will be understood that this invention is not to be limited by such description and drawings, but rather by the appended claims.

What is claimed is:

1. A molded bus assembly comprising a molded body of insulating material having an elongated body portion and at least one connector housing molded integral therewith, said connector housing extending transversely of said body portion and having at least one channel running the length thereof adapted to receive a terminal contact and an electrically conducting bus structure sealed within said molded body portion, said bus structure having at least one tab extending transversely of said bus structure, the end portion of which extends into said channel of said connector housing.

2. A molded bus asembly comprising a molded body of insulating material having an elongated body portion and at least one connector housing molded integral therewith, said connector housing extending transversely of said body portion and having a pair of oppositely disposed channels running the length thereof, each of said channels being adapted to receive a terminal contact, and an electrically conducting bus structure sealed within said molded body portion, said bus structure having at least one pair of oppositely disposed tabs extending transversely of said bus structure, the end portion of one of said pair of tabs extending into one of said channels of said connector housing and the end portion of said other of said pair of tabs extending into said other channel of said housing.

3. A molded bus assembly comprising a molded body of insulating material having at least one connector housing molded integral therewith, said connector housing having a pair of oppositely disposed channels running the length thereof, and a bus sandwich encapsulated within said molded body, said bus sandwich comprising a pair of electrically conducting plates and a sheet of insulating material interposed therebetween, each of said conducting plates having a tab extending transversely thereto, said tabs being oppositely disposed and extending in opposite directions, the end portion of one of said tabs being free of insulation and extending into one of said channels of said connector housing and the end portion of the other of said tabs being free of insulation and extending into the other channel of said connector housing.

4. The molded bus assembly of claim 3 including in combination at least one terminal contact positioned within one of said channels of said connector housing, said terminal contact being affixed to said tab extending into said channel.

5. A molded bus assembly comprising a molded body of insulating material having at least one connector housing molded integral therewith, said connector housing having a pair of oppositely disposed channels running the length thereof, each of said channels having a pair of oppositely disposed side walls, each of said side walls having a straight forward portion, a chamfered intermediate portion and a straight rearward portion, the spacing between said straight forward portions of said side walls being less than the spacing between said straight rearward portions of said side walls, and a bus sandwich encapsulated within said molded body, said bus sandwich comprising a pair of electrically conducting plates and a sheet of insulating material interposed therebetween, each of said conducting plates having at least one tab extending transversely thereto, said tabs being oppositely disposed and extending in opposite directions, the end portion of one of said tabs extending into one of said channels substantially at the rear thereof and the end portion of the other of said tabs extending into the other of said channels substantially at the rear thereof.

6. The molded bus assembly of claim 5 wherein each of said channels has an upper wall which is notched at the rear thereof, the depth of said notch being such as to allow insertion of a tool to affix a terminal contact to said tab projecting into said channel.

7. A molded bus assembly comprising a molded body of insulating material having at least one connector housing molded integral therewith, a bus sandwich encapsulated within said molded body, said connector housing having a pair of oppositely disposed channels running the length thereof and positioned on either side of said bus sandwich, each of said channels having a pair of oppositely disposed side walls, each of said side walls having a straight forward portion, a chamfered intermediate portion and a straight rearward portion, the spacing between said straight forward portions of said side walls being less than the spacing between said straight rearward portions of said side walls, said bus sandwich comprising a pair of electrically conducting plates and a sheet of insulating material interposed therebetween, each of said conducting plates having at least one tab extending transversely thereto, said tabs being oppositely disposed and extending in opposite directions, the end portion of said tab of one of said plates extending into one of said channels in the rearward portion thereof and the end portion of said tab of said other plate extending into said other channel in the rearward portion thereof, and a pair of contact elements, one of said contact elements being inserted into one of said channels of said housing and being affixed to said tab of one of said plates and said other contact element being inserted into the other of said channels of said housing and being affixed to said tab of said other plate.

References Cited

UNITED STATES PATENTS 2,451,506 10/1948 O'Brien et al. -------- 339—22

MARVIN A. CHAMPION, *Primary Examiner.*

P. A. CLIFFORD, *Assistant Examiner.*